No. 818,916. PATENTED APR. 24, 1906.
M. RODGERS.
FRUIT DRIER.
APPLICATION FILED NOV. 28, 1905.
2 SHEETS—SHEET 2.

Inventor
M. Rodgers.

Witnesses

UNITED STATES PATENT OFFICE.

MACK RODGERS, OF GRAVETTE, ARKANSAS.

FRUIT-DRIER.

No. 818,916.   Specification of Letters Patent.   Patented April 24, 1906.

Application filed November 28, 1905. Serial No. 289,539.

*To all whom it may concern:*

Be it known that I, MACK RODGERS, a citizen of the United States, residing at Gravette, in the county of Benton, State of Arkansas, have invented certain new and useful Improvements in Fruit-Driers; and I do hereby declare the following to be a full, clear, and exact description of the invention, such as will enable others skilled in the art to which it appertains to make and use the same.

This invention relates to fruit-driers, and has for its object to provide a device of this character which will thoroughly and quickly dry fruit of any kind.

A further object of the invention is to provide a series of drums into which fruit is automatically dumped and which are automatically opened to discharge the fruit after it has been dried.

The invention also includes means for revolving the drums during their passage through the drying-room.

Figure 1:
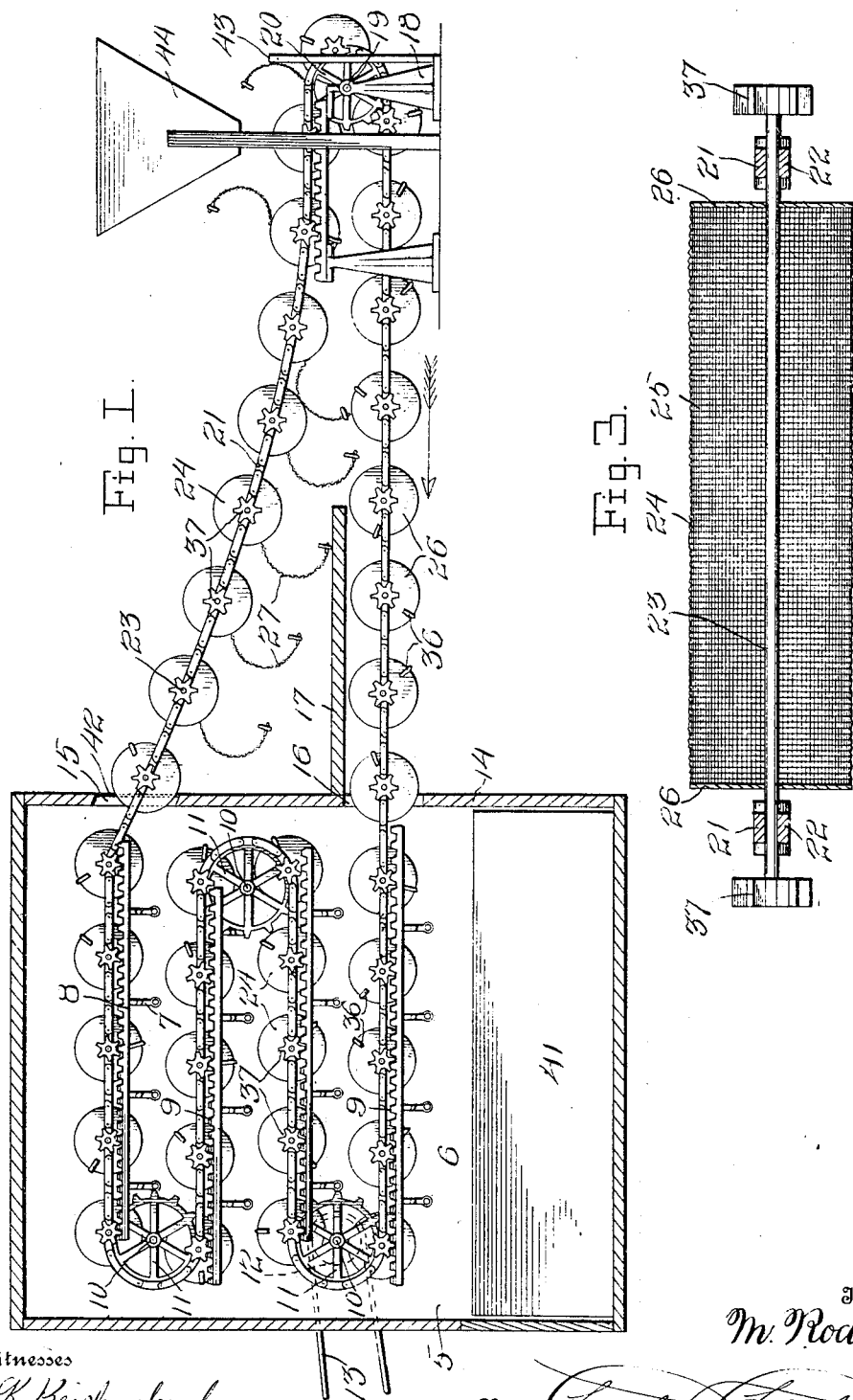
Figure 2:
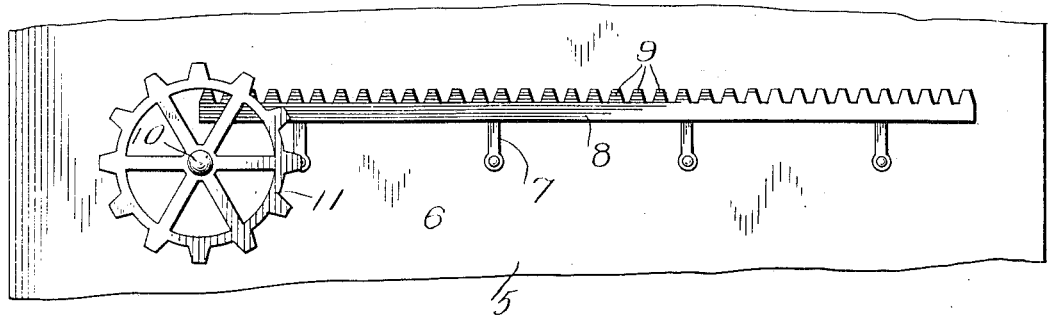
Figure 4:
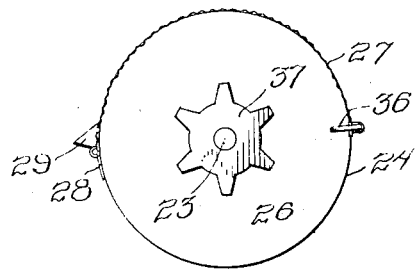
Figure 5:
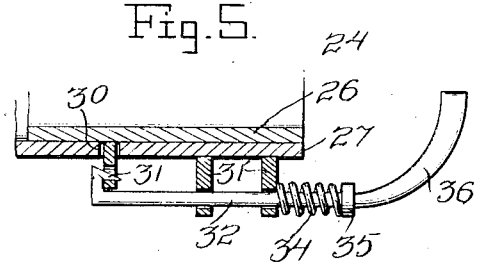

In the accompanying drawings, in which like numerals of reference indicate similar parts throughout the several views, Figure 1 is a side elevation of my device, the drying-room being shown in section. Fig. 2 is a side elevation of a portion of one of the walls of the drying-room. Fig. 3 is a vertical longitudinal sectional view in detail through one of the fruit-carrying drums. Fig. 4 is a detail end elevation of one of the drums. Fig. 5 is a detail view of one of the latches for the closures of the drums.

Referring to the drawings, the numeral 5 indicates the drying-room used in connection with my device, and 6 the side walls of the same. Mounted upon the said side walls and extending inwardly therefrom are brackets 7, upon which are mounted tracks 8, having formed on their upper edges rack-teeth 9. Mounted upon stub-shafts 10, located upon the said walls slightly below alternate ends of the uppermost tracks 8, are sprocket-gears 11. The said sprocket-gears 11 are disposed at directly-opposite points on the said walls, as shown. The stub-shafts upon which the lowermost sprocket-gears are mounted extend through the said side walls 6 and are provided exterior to the said side walls with pulleys 12, driven by belts 13 in any suitable manner. (Not shown.) The front end wall 14 of the drying-room 5 is provided with openings 15 and 16, and above the opening 16 and extending forwardly from the said wall 14 is a platform 17. Mounted in advance of the said wall 14 are a pair of oppositely-disposed standards 18, in the upper ends of which are mounted the ends of an idler-shaft 19, which is provided adjacent its ends with sprocket-gears 20. Over the said gears 20 and the gears 11 are passed sprocket-chains 21, the lower stretches of said chains being arranged to run parallel to the lowermost tracks of the series of tracks in the drying-room and thence upwardly and over the lowermost sprocket-gears. The said chains then run parallel and adjacent to the tracks next above the lowermost tracks, and so on throughout the series. Bearing-links 22 are disposed at intervals throughout the chains 21, the said links 22 being arranged in opposition to each other throughout the entire length of the said chains. Mounted in the said bearing-links of each chain are shafts 23, upon which are mounted to revolve fruit-carrying drums 24. Each of these drums comprises a foraminous body portion 25, which is substantially cylindrical in form and which has its ends closed by means of circular plates 26. The body portion of the said drum is opened for a portion of its circumference, and to the said body portion is hinged a cover 27 of the same material as the remainder of the drum. A spring 28 is secured to the body portion of the drum and the cover at the hinged edges of the same, the said spring having a tendency to move said cover to an open position. To prevent the cover 27 from opening to too great an extent, lugs 29 are provided thereon in such a position that they will engage the body portion of the drum and limit the movement of the cover 27. The cover 27 is provided adjacent its ends with slots 30, adapted to receive keepers 31 on the body portion of the drum. Carried by the said cover to one side of the said slots 30 are apertured lugs 31', through which is engaged a sliding bolt 32. The end of the bolt 32 adjacent the keeper 31 is hooked to engage said keeper and is provided with a sloped face which when engaged by said keeper by swinging the cover 27 to a closed position will cause the said bolt to slide in said lugs against the tension of a spring 34, seated between one of said lugs and a collar 35 on the said bolt, the said spring 34 causing the hooked end of said bolt 32 to be automatically engaged with the keeper 31. The end of the bolt opposite to its hooked end is curved laterally, as at 36, for a purpose to be hereinafter described. Mounted on the shaft 23, adjacent each of its ends and exterior of the plates 26, are pinions 37, and mounted between said drying-room 5 and said standards 18 are standards 38, upon which and said standards 18 are arranged tracks 39, having formed on their upper edges rack-teeth 40, the said tracks being arranged in the path of the said pinions 37.

Power being applied to the belt 13 to revolve the shaft 11, the chain of fruit-carrying drums is moved in the direction indicated by the arrow in Fig. 1, the said chain of drums passing under the platform 17, through the opening 16, and back and forth through the drying-room, and thence through the opening 15. During the passage of the said drums through the drying-room 5 the pinions 37 on the drum-shaft engage the rack-teeth 9, causing the said drum to revolve, the direction of revolution being reversed as each track is reached, as will be readily understood. Disposed below the said drums in the drying-room is a suitable heating device 41, which serves to heat the said drums and the fruit contained therein during their passage through the said drying-room 5. As the said drums pass through the opening 15 the curved portions 36 of the bolts 32 on each drum are engaged by trips 42, thereby releasing the said cover and depositing the fruit contained in the drum upon the platform 17. After this operation the drums travel with their covers in an open position until they reach the track 39, at which point the pinions 37 on each drum-shaft engage the rack-teeth 40 of the track 39, serving to revolve the drums and their covers. As the drums approach the opposite end of the said track the covers 27 are engaged by a trip member 43 and are closed thereby. Immediately preceding the engagement of the covers 27 by the trip 43 the drum adjacent the end of the track 39 having been so revolved that its open side is uppermost fruit is deposited therein from a hopper 44 in any suitable automatic manner.

From the foregoing it will be seen that my fruit-drier is entirely automatic in operation and that no handling of the fruit is necessary, the same being automatically deposited in the fruit-carrying drums and after being dried automatically dumped from said drums. The prolonged course taken by the chain of drums through the drying-room 5 serves to thoroughly dry the fruit, the greatest amount of heat being applied when the fruit is wet and the least amount being used when it is dryest, thus preventing scorching of the fruit.

What is claimed as new is—

1. In a fruit-drier, the combination with a drying-room, and a heater therein, of a chain of fruit-carrying drums arranged for travel through said room, and means whereby said drums may be moved away from said heater during their passage through the said room.

2. In a fruit-drier, the combination with a drying-room and a heater therein, of a chain of fruit-carrying drums arranged for travel through said room, means for revolving said drums, and means for moving said drums step by step from the said heater during their passage through the said room.

3. In a fruit-drier, the combination with a drying-room and a heater therein, of a chain of fruit-carrying drums arranged for passage through said room, means for revolving said drums in alternately-opposite directions during their passage through the said room, and means for moving said drums step by step from said heater.

4. In a fruit-drier, the combination with a drying-room and a heater therein, of a chain of fruit-carrying drums arranged for passage through said room, means carried by opposite walls of said room for revolving the said drums during their passage through the said room, said means being arranged to revolve the drums in alternately-opposite directions and means for moving said drums backwardly and forwardly above said heater and step by step from the same.

5. In a fruit-drier, the combination with a drying-room and a heater therein, of a chain of fruit-carrying drums arranged for passage through said room, and backwardly and forwardly above said heater and from the same, means for revolving said drums in alternately-opposite directions and means for moving said chain.

6. In a fruit-drier, the combination with a drying-room and a heater therein, of a pair of driven sprockets mounted upon opposite walls of said room, idler-sprockets mounted upon said walls, tracks arranged above said sprockets and a track arranged below said driven sprocket, a shaft mounted exterior to said room, sprockets carried by said shaft, a chain engaged over said sprockets, fruit-carrying drums carried by said chain, means associated with said drums for engagement with said track whereby said drums may be revolved during their passage through the said room, closures for said drums, latches for holding said closures in closed position, and means for unlatching said closures subsequent to the passage of the drums from the said room.

7. In a fruit-drier, in combination with a drying-room and a heater therein, of driven sprockets mounted upon opposite walls of said room, idler-sprockets mounted upon said walls, tracks provided with rack-teeth disposed above said sprockets, standards mounted exterior to said room, a shaft mounted in said standards, sprockets carried by said shaft, chains engaged with said sprockets, drum-shafts connecting said chains, drums carried by said shafts and pinions carried by said shafts exterior to said drums, said drums including hinged closures, means for holding said closures in a closed position, means arranged for engagement therewith for releasing said closures, standards mounted between said drum and said first-named standards, tracks supported by the standards, said tracks being provided with rack-teeth, the said pinions being arranged for engagement with said first and last named tracks for revolving the said drum, and means for returning said closure to its normal position.

In testimony whereof I affix my signature in presence of two witnesses.

MACK RODGERS.

Witnesses:
L. M. SIPES,
W. H. HORTON.